US011596891B2

(12) United States Patent
Jeon et al.

(10) Patent No.: US 11,596,891 B2
(45) Date of Patent: Mar. 7, 2023

(54) AIR PURIFYING SYSTEM

(71) Applicants: LG ELECTRONICS INC., Seoul (KR); CHUNGANG UNIVERSITY INDUSTRY ACADEMIC COOPERATION FOUNDATION, Seoul (KR)

(72) Inventors: Jongkeon Jeon, Seoul (KR); Haeyoong Chung, Seoul (KR); Jiyoung Kang, Seoul (KR); David Kangseong Lee, Seoul (KR); Daeyoung Kwak, Seoul (KR); Sohee Park, Seoul (KR)

(73) Assignees: LG ELECTRONICS INC., Seoul (KR); CHUNGANG UNIVERSITY INDUSTRY ACADEMIC COOPERATION FOUNDATION, Seoul (KR)

( * ) Notice: Subject to any disclaimer, the term of this patent is extended or adjusted under 35 U.S.C. 154(b) by 412 days.

(21) Appl. No.: 16/819,368

(22) Filed: Mar. 16, 2020

(65) Prior Publication Data
US 2020/0298167 A1    Sep. 24, 2020

(30) Foreign Application Priority Data
Mar. 19, 2019    (KR) .................. 10-2019-0031509

(51) Int. Cl.
*B01D 46/42*    (2006.01)
*H02J 50/10*    (2016.01)
*B01D 46/00*    (2022.01)

(52) U.S. Cl.
CPC ..... *B01D 46/4245* (2013.01); *B01D 46/0013* (2013.01); *B01D 46/4227* (2013.01);
(Continued)

(58) Field of Classification Search
CPC ............ B01D 46/4245; B01D 46/0005; B01D 46/0013; B01D 2221/08; B01D 2273/30;
(Continued)

(56) References Cited

U.S. PATENT DOCUMENTS

| 4,416,775 A | 11/1983 | Halbich |
| 6,001,145 A | 12/1999 | Hammes |

(Continued)

FOREIGN PATENT DOCUMENTS

| CN | 1510348 | 7/2004 |
| CN | 1651827 | 8/2005 |

(Continued)

OTHER PUBLICATIONS

Chinese Office Action dated Dec. 9, 2021 issued in Application No. 202010118631.9.

(Continued)

*Primary Examiner* — Robert Clemente
(74) *Attorney, Agent, or Firm* — Ked & Associates, LLP

(57) ABSTRACT

An air purifying system includes first, second, and third air purifiers controlled independently and a docking station having first, second, and third supports configured to support and charge the first, second, and third air purifiers. The docking station has a vertical backbone, and the first, second, and third supports horizontally extend from the backbone. At least the second and third air purifiers are configured to be separated from the docking station and include handles to assist a user in transporting the second and third air purifiers to separate rooms or indoor spaces.

20 Claims, 13 Drawing Sheets

(52) U.S. Cl.
CPC .......... *H02J 50/10* (2016.02); *B01D 2221/08* (2013.01); *B01D 2273/30* (2013.01)

(58) Field of Classification Search
CPC ................ B01D 46/24; B01D 46/2403; B01D 46/0043; B01D 46/62; B01D 46/64; B01D 46/0002; B01D 46/0004; B01D 46/0049; B01D 46/58; B01D 46/60; B01D 46/442; B01D 2267/60; B01D 2279/50; F24F 2221/12; F24F 8/10; F24F 8/108; F24F 1/0071
See application file for complete search history.

(56) References Cited

U.S. PATENT DOCUMENTS

| | | | |
|---|---|---|---|
| 7,419,533 | B2 | 9/2008 | Son et al. |
| 10,302,321 | B2 | 5/2019 | Sakai et al. |
| 2004/0118288 | A1 | 6/2004 | Kim et al. |
| 2005/0172816 | A1* | 8/2005 | Son .................... B01D 46/0013 96/417 |
| 2005/0268583 | A1 | 12/2005 | Han et al. |
| 2006/0107834 | A1 | 5/2006 | Vandenbelt |
| 2006/0162300 | A1 | 7/2006 | Sharifi |
| 2006/0277875 | A1 | 12/2006 | Schuld |
| 2017/0248153 | A1 | 8/2017 | Park |
| 2019/0160411 | A1* | 5/2019 | Chu .................... B01D 46/0056 |

FOREIGN PATENT DOCUMENTS

| | | |
|---|---|---|
| CN | 1752617 | 3/2006 |
| CN | 104822999 | 8/2015 |
| CN | 105091105 | 11/2015 |
| CN | 105823135 | 8/2016 |
| CN | 106813315 | 6/2017 |
| CN | 107023885 | 8/2017 |
| CN | 108662711 | 10/2018 |
| EP | 1 433 516 | 6/2004 |
| KR | 10-2006-0026319 | 3/2006 |
| KR | 10-2016-0077888 | 7/2016 |
| WO | WO 2004/014521 | 2/2004 |
| WO | WO 2017/026761 | 2/2017 |
| WO | WO 2017/142026 | 8/2017 |

OTHER PUBLICATIONS

European Search Report dated Aug. 12, 2020 issued in Application No. 20163888.9.
Chinese Office Action issued in Application No. 2021102903629710 dated Nov. 3, 2021.
European Office Action dated Apr. 14, 2022 issued in EP Application No. 20163888.9.
United States Office Action dated May 6, 2022 issued in co-pending related U.S. Appl. No. 16/818,180.
U.S. Appl. No. 16/818,096, filed Mar. 13, 2020.
U.S. Appl. No. 16/818,180, filed Mar. 13, 2020.
U.S. Appl. No. 16/819,368, filed Mar. 16, 2020.
European Search Report dated Aug. 10, 2020 issued in Application No. 20160848.6.
Chinese Office Action dated Jun. 11, 2021 issued in CN Application No. 202010118631.9.
European Search Report dated Aug. 25, 2020 issued in Application No. 20161011.0.
Chinese Office Action dated Jun. 24, 2021 issued in Application No. 202010181669.0.
Chinese Office Action issued in Application No. 202010115748.1 dated May 11, 2021.
U.S. Office Action dated Nov. 23, 2022 issued in U.S. Appl. No. 16/818,096.

* cited by examiner

AIR PURIFYING SYSTEM

CROSS-REFERENCE TO RELATED APPLICATION(S)

The present application claims priority under 35 U.S.C. § 119 to Korean Patent Application No. 10-2019-0031509, filed on Mar. 19, 2019, whose entire disclosure is hereby incorporated by reference.

BACKGROUND

1. Field

The present disclosure relates to an air purifying system.

2. Background

An air purifier or cleaner may be a device that suctions contaminated or ambient air, filters or purifies the suctioned air, and then discharges the purified air. The air purifier may include a fan that suctions outside or ambient air into an interior of the air purifier and a filter to filter dust, germs, etc. from the suctioned air.

An air purifier may be configured to purify a particular interior space such as a home or office. The air purifier may be manufactured in a predetermined shape and size according to a predetermined design. A consumer may purchase an air purifier that best matches a size and capacity desired for a particular indoor space or room, but it is difficult for a consumer to purchase an air purifier that may suit a plurality of indoor spaces in the consumer's unique residential environment or that may suit a variety of situations arising in the residential environment.

WO 2017/026761A1 discloses varying a suction and discharge of air based on a deformable filter in an air purifier. The filter may be modified in accordance with an installation environment of the air purifier. However, using such a filter-modifying technique to customize an air purifier is difficult because it is difficult to know what shape should be implemented for the filter, and the filter must be manually modified by the user. Even if the filter of the air purifier is appropriately modified, the air purifier may still only efficiently clean one particular room or area.

The above references are incorporated by reference herein where appropriate for appropriate teachings of additional or alternative details, features and/or technical background

BRIEF DESCRIPTION OF THE DRAWINGS

The embodiments will be described in detail with reference to the following drawings in which like reference numerals refer to like elements wherein.

DETAILED DESCRIPTION OF THE INVENTION

Figure 1:
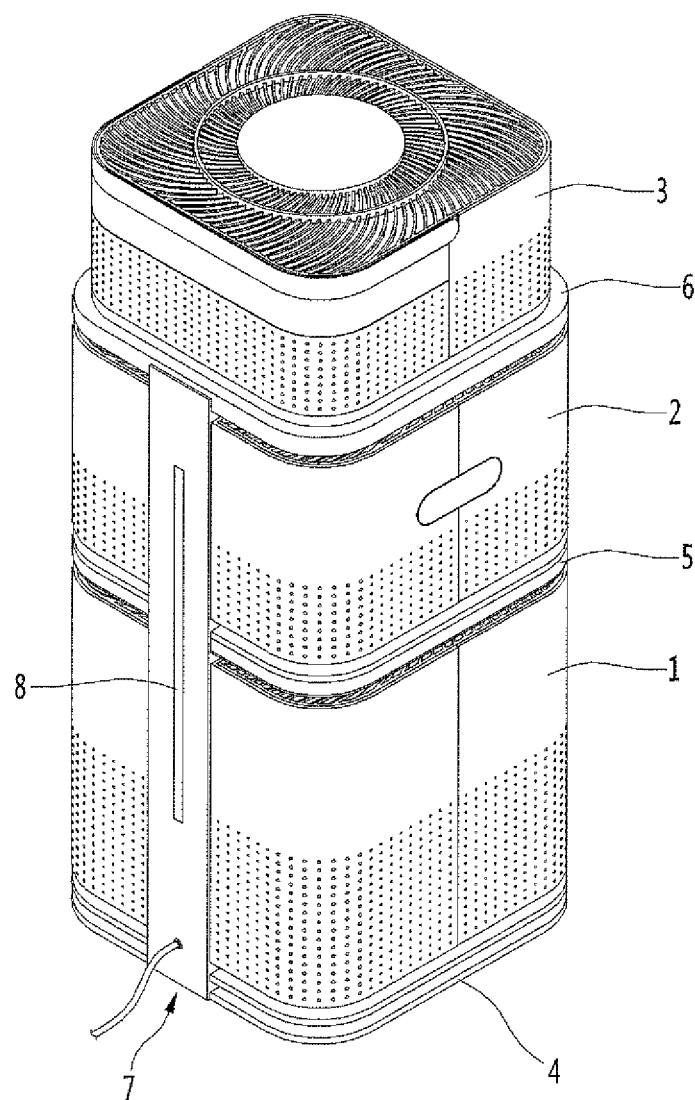
FIG. 1 is a rear perspective view of an air purifying system.

Referring to FIG. 1, an air purifying system according to an embodiment may include at least three air purifiers 1, 2, and 3 capable of independently operating and a docking station 7 for assembling them together. Although the three air purifiers 1, 2, 3 may be moved to various rooms in a residential environment, the docking station 7 may also be moved.

Since the docking station 7 may weigh more than each of the three air purifiers 1, 2, 3 individually, it may be harder for a user to move the docking station. The user may place the docking station 7 in the largest or dirtiest space desired to be cleaned by the user in conjunction with an air purifier among the three air purifiers 1, 2, and 3 having the largest or strongest cleaning capacity. For example, the user may keep the docking station in a living room or family room serving as a main living space where a large amount of air purifying may be required. Air purifiers among the three air purifiers 1, 2, and 3 that weigh less and which may have a smaller or weaker cleaning capacity may be easily removed from the docking station 7 and carried to smaller rooms, rooms having less traffic, or specialized spaces such as a study room, a smaller living room, a bedroom or guest room, or in a kitchen near a stove.

The docking station 7 may be provided with a backbone 8 extending substantially vertically (i.e., upward and downward), a first support or pedestal 4 extending laterally or forward from a bottom of the backbone 8, a second support 5 spaced apart from the first support 4 and extending forward from a middle of the backbone 8, and third support 6 spaced apart from the second support 5 and extending forward from a top of the backbone 8. The three air purifiers 1, 2, and 3 may include a first air purifier 1, a second air purifier 2, and a third air purifier 3. The first support 4 may be configured to support the first air purifier 1, the second support 5 may be configured to support the second air purifier 2, and the third support 6 may be configured to support the third air purifier 3. The first, second, and third supports 4, 5, and 6 may alternatively be referred to as frames or trays.

Each of the first, second, and third air purifiers 1, 2, and 3 may have a rectangular or square horizontal cross-section, but embodiments disclosed are not limited hereto. For example, the first, second, and third air purifiers 1, 2, and 3, may have circular or elliptical horizontal cross sections. Each of the first, second, and third supports 4, 5, and 6 may be provided as a frame having a horizontal cross-sectional shape corresponding to the horizontal cross-sectional shape of each air purifier 1, 2, and 3, respectively. For example, if the first, second, and third air purifiers 1, 2, and 3 have square horizontal cross-sections, the first, second, and third supports 4, 5, and 6 may be square frames. The first, second, and third air purifiers 1, 2, and 3, and the corresponding first, second, and third supports 4, 5, and 6 may have different cross-sectional shapes, or may have similar cross-sectional shapes to make stacking easy and stable. Cross-sectional areas of the first, second, and third supports 4, 5, and 6 may be larger than cross-sectional areas of the first, second, and third air purifiers 1, 2, and 3.

There may be a plurality of air purifiers, and a number of supports may equal a number of air purifiers. Each of the first, second, third, etc. air purifiers 1, 2, and 3 may be separated from respective first, second, third, etc. supports 4, 5, 6 and used separately at different places or rooms.

Alternatively, at least one of the air purifiers 1, 2, and/or 3 may be integrated with its respective support 4, 5, and/or 6 and may not be separated. For example, the first air purifier 1 may be integrated with the first support 4. In this case, any fixing devices used to integrate or secure the first air purifier 1 with the the first support 4 may be provided as a solid base frame. The base frame may support a total load of the air purifying system according to an embodiment. In another case, a base of the first air purifier 1 may be the first support 4, and the first air purifier 1 may be integrated with the backbone 8 and/or the docking station 7, as well. The docking station 7, integrated with the first air purifier 1, may be located in a largest, most trafficked, or dirtiest space in a residential environment. In another alternative, the second air purifier 2 may be integrated with the backbone 8 of the docking station 7 and/or the second support 5. In these alternative embodiments where one of the air purifiers 1 or 2 is integrated with the docking station 7, whichever air purifier 1 or 2 is integrated with the docking station 7 may have the largest or strongest cleaning capacity, and may optionally be heaviest in weight.

For convenience of description, an embodiment where all three air purifiers 1, 2, and 3 are separable from the docking station 7 will be described. In such an arrangement, the first air purifier 1, being docked at the bottom of the docking station 7, may have the largest weight and the largest air cleaning capacity. The second air purifier 2 may have a smaller air purifying capacity and weight than the first air purifier 1 and a larger air purifying capacity and weight than the third air purifier 3. Air cleaning or purifying capacities may be measured by cubic feet of air per minute or CFM.

The ratio of the air purifying capacities or CFMs of the first, second and third air purifiers 1, 2, and 3 may be, for example, 5:3:2. In this case, the first air purifier 1 may be suitable for a family room or large living room, the second air purifier 2 may be suitable for a smaller living room or bedroom, and the third air purifier 3 may be suitable for a smaller room or space such as a bathroom, study, kitchen area, etc.

Figure 2:
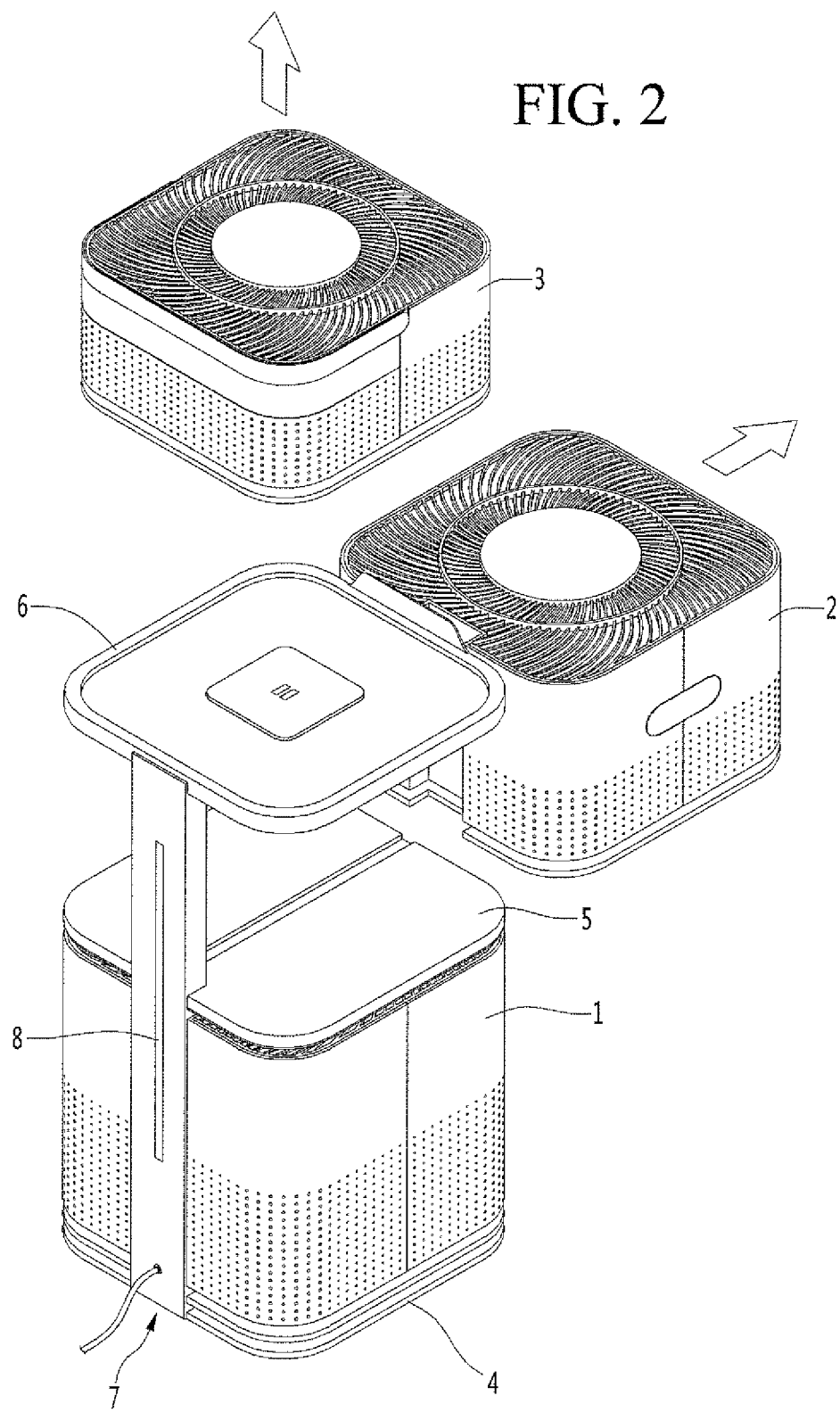
FIG. 2 is a illustrating a separation method of each air purifier.

Referring to FIG. 2, the first air purifier 1 may have the largest weight among the first, second, and third air purifiers 1, 2, and 3. In a case where the first air purifier 1 is integrated as one body with the docking station 7, a weight of the first air purifier 1 and the docking station 7 may be larger than individual weights of the second and third air purifiers. A center of gravity or mass of the air purifying system may be relatively low, thereby preventing overturning of the docking station 7 due to an external impact and preventing breakage.

The second air purifier 2 may be pushed or slid rearward (i.e., toward the backbone 8) and mounted on the second support 5 of the docking station 7. The second air purifier 2 may be pulled or slid forward (i.e., away from the backbone 8) to be separated from the docking station 7. The third air purifier 3 may be moved downward to be seated or mounted on the third support 6 of the docking station 7. The third air purifier 3 may be lifted upward to be separated and removed from the docking station 7.

When the second and third air purifiers 2 and 3 are mounted on the second and third supports 5 and 6, the docking station 7 and the first and second air purifiers 2 and 3 may communicate with each other (e.g., via wireless communication, BlueTooth communication, wired communication, etc.) When the second and third air purifiers 2 and 3 are mounted on the second and third supports 5 and 6, the first and second air purifiers 2 and 3 may be charged from energy supplied by the docking station 7 via a wireless power transfer or WPT method, other wireless method, or wired method.

Figure 3:
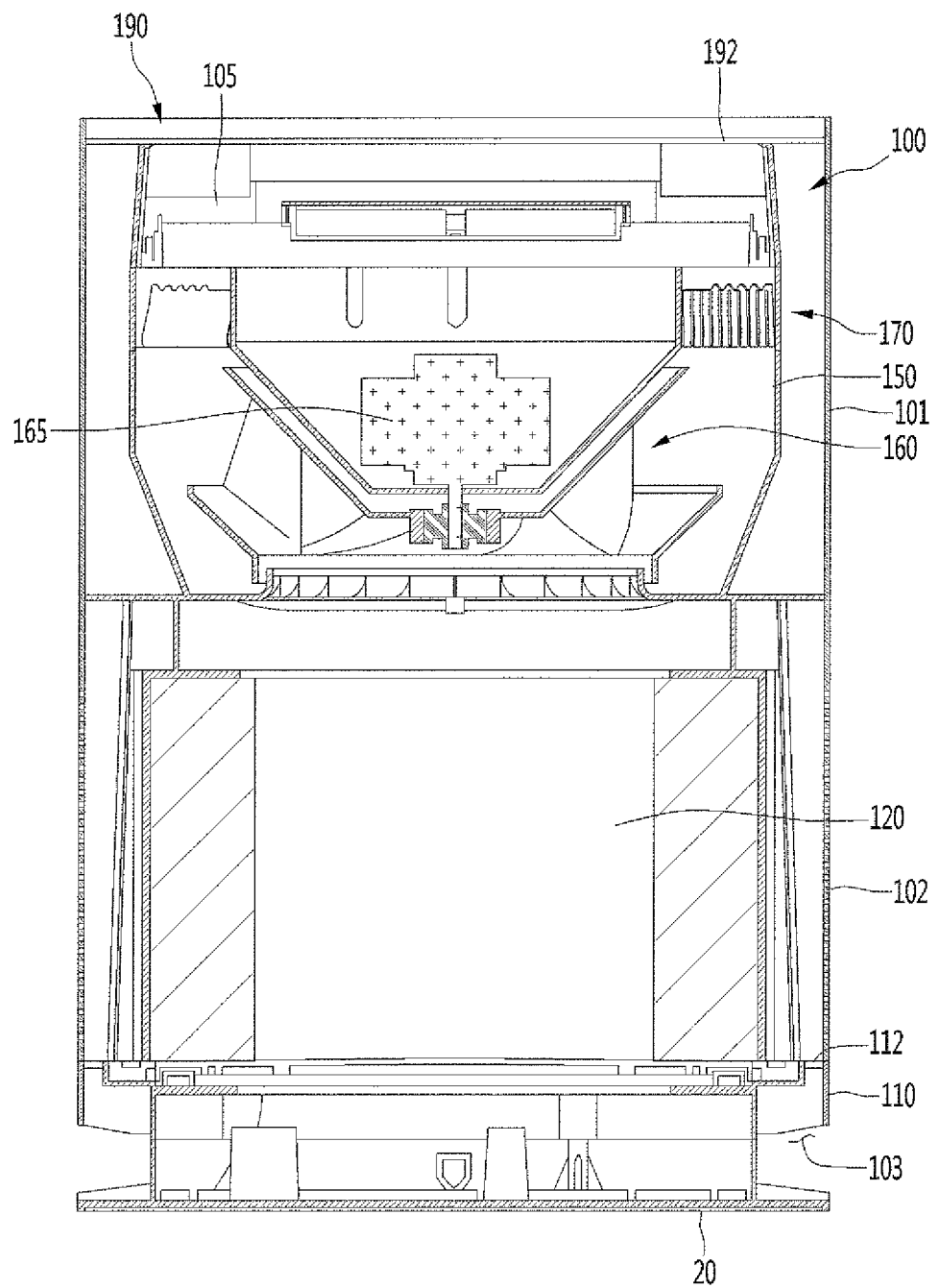
FIG. 3 is a vertical sectional view of the first air purifier.

The first, second, and third air purifiers 1, 3, and 3 may each have a fan 160 and a filter 120 (FIG. 3). The fan 160 may provide negative pressure to suction ambient air through a side of the air purifier 1, 2, or 3 into an interior. Foreign matter in the suctioned air may be filtered by the filter 120, and clean air may be discharged through a top or side surface back to an outside of the air purifier 1, 2, or 3. The first, second, and third air purifiers 1, 2, and 3 may each have displays at a top or front surface to display operating statuses of each of the individual air purifiers or of the entire air purifying system. A plurality of lights may be provided on the docking station 7 to illuminate the indoor space and/or to make the air purifying system more visible to the user.

Although the first, second, and third air purifiers 1, 2, and 3 are provided in similar configurations or structures, the first, second, and third air purifiers 1, 2, and 3 may be different height, length, width, shape, or size. For example, the first air purifier 1 may have a larger height and width than the third air purifier 3. The first air purifier 1 may have a larger height than the second air purifier 2, but an equal width.

Figure 4:
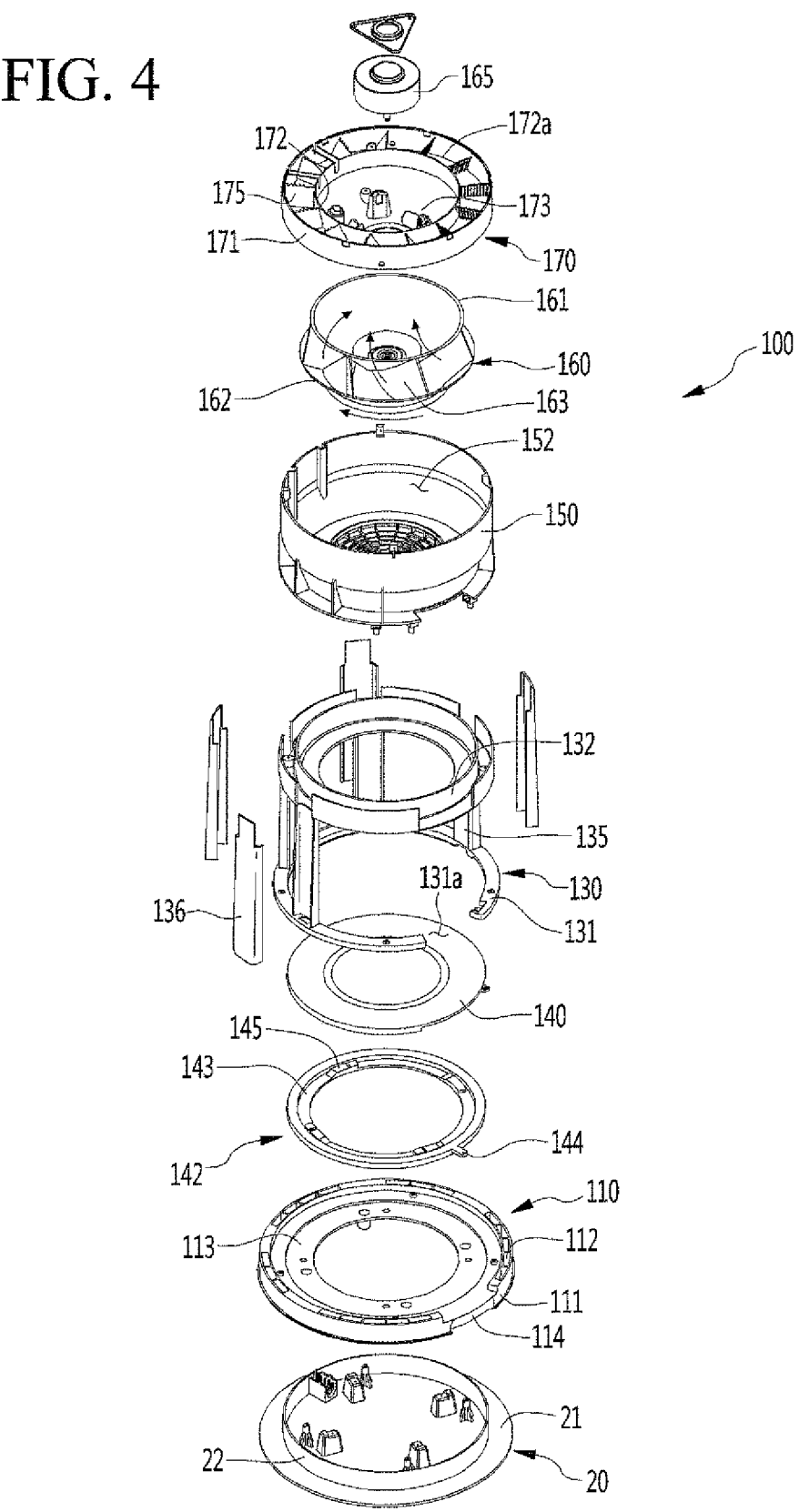
FIG. 4 is an exploded perspective view of a fan and an interior of the each air purifier.

Referring to FIGS. 3 and 4, an internal structure of each of the first, second, and third air purifiers 1, 2 and 3 may be similarly applied. FIG. 3 shows an internal structure of the first air purifier 1, but such an internal structure may be substantially similar to an internal structure of the second and third air purifiers 2 and 3.

The first air purifier 1 may generate an air flow via a fan 160 to suction ambient air from below or at a lower side of the first air purifier 1.

The first air purifier 1 may include a case 101 forming an outer appearance and an outer surface. The case 101 may be provided as a rectangular container (or, if the first air purifier 1 has a cylindrical or round shape, the case 101 may be provided as a cylindrical container). The first air purifier 1 may be referred to as a first air purifying module in that it has a filter and functions to purify the air.

The case 101 may include a separation device or lock in which two shells constituting the case 101 may be joined or separated. The case 101 may further include a hinge provided on a side of the case 101 opposite to a side having the separation device. The two shells constituting the case 101 may rotate about the hinge to open and close the case 101. When the case 101 is opened, the case 101 may be separated from the device inside of the first air purifier 1 for replacement or reparation of the internal devices or components (e.g., the filter 120) of the first air purifier.

A case or side suction portion 102 through which air is suctioned may be formed in a lower portion of the case 101. The side suction portion 102 may be provided with at least one through-hole formed through at least a portion of the case 101. A plurality of through-holes may form the side suction portion 102.

The plurality of side suction portions 102 may be uniformly formed along an outer surface of the case 101 so that air can be suctioned from any direction (i.e., 360°) around the case 101 with respect to a vertical center axis passing through tan inner center of the case 101. Such a configuration of the side suction portions 102 may increase a flow of air into the first air purifier 1. The case 101 may be formed in a rectangular tube shape, and air suctioned through the side suction portions 102 may flow in a substantially radial direction from the outer surface of the case 101.

A vertical direction may be referred to as an axial direction, and a horizontal direction may be referred to as a radial direction. The axial direction may correspond to a central axis or motor axial direction of the fan 160. The radial direction can be understood as a direction perpendicular to the axial direction. A circumferential direction may be a rotation direction around the axial direction.

The first air purifier 1 may include a base 20 provided on a lower side of the case 101. The base 20 of the first air purifier 1 may be placed on a floor or ground surface. The base 20 may be provided below a lower end of the case 101. At least a portion of the base 20 may be laterally or vertically spaced apart from the case 101. The base suction portion 103 may be formed by a space between the case 101 and the base 20.

A suction grill 110 may extend below the lower end of the case 101. The base suction portion 103 may be a space between the base 20 and the suction grill 110, and may include or communicate with a suction port 112 formed in the suction grill 110. The air sucked through the base side suction portion 103 may flow upward through the suction port 112 of the suction grill 110 provided on the upper side of the base 20. When the first air purifier 1 is provided below the second air purifier 2, air discharged from the first air purifier 1 may be suctioned through the base suction portion 103 and the suction port 112. Air present in a lower portion of an indoor space may be easily introduced into the first air purifier 1 through the plurality of side and base suction portions 102 and 103 to increase an intake amount of air.

A discharging port or portion 105 may be formed in an upper portion of the first air purifier 1. The discharge portion 105 may be formed at or under a discharge grill 192 of a discharge guide device or discharge guide 190 provided in the first air purifier 1. The discharge guide 190 may form an upper end of the first air purifier 1, and the discharge grill 192 may form an outer upper surface of the first air purifier 1.

The air discharged through the discharge portion 105 may flow upward in the axial direction. Clean air discharged through the discharge portion 105 may be spread radially by the discharge grill 192. The discharge grill 192 may be an opening formed in a spiral shape such that clean air discharged through the discharge portion 105 may have a velocity component in the circumferential direction.

The first air purifier 1 may further include a suction grill 110 provided at an upper side of the base 20. The base 20 may include a base body 21 configured to be placed on the floor and a base protrusion or flange 22 protruding upward from the base body 21. The base protrusion 22 may surround engagement devices provided on an upper surface of the base body 21 and configured to couple to holes formed in and/or engagement devices on a bottom of the grill body 111. At least a portion of the suction grill 110 and/or the case 101 may be placed on the base protrusion 22.

The base protrusion 22, the base body 21n and the suction grill 110 may be spaced apart from each other. The base suction portion 103 may be formed between the base 20 and the suction grill 110 to form an air suction space provided adjacent to the base body 21 and flange 22, the suction grill 110, and/or a bottom end of the case 101.

The suction grill 110 may include a substantially ring-shaped grill body 111 and an inlet or opening 112 formed at an edge or rim of the grill body 111. The suction ports 112 may be spaced apart from one another along the rim. The plurality of suction ports 112 may communicate with the base suction port 103.

The air purifier 1 may further include a filter 120 provided above the suction grill 110 to filter suctioned air. The air sucked through the side and base suction portions 102 and 103 may pass through an outer peripheral surface of the filter 120. The filter 120 may be cylindrical, and suctioned air may pass through an outer circumferential surface. However, shapes of the filter 120 are not limited hereto. As another example, the filter 120 may have a curved square or rectangle shape or a shape corresponding to an inner contour of the case 101. The filter 120 may have a filter surface to filter air. A type of filter 120 is not limited. For example, the filter 120 may be a HEPA filter, a carbon filter, a pleated filter, a mesh filter or strainer, a foam material, etc. or any combination of these filters.

The suction grill 110 may include a lever support portion or inner edge 113 to form an upper surface of the grill body 111 and to support a lever or locking device 142. The lever support portion 113 may be an inner radial edge recessed from an outer portion or edge of the grill body 111. An outer peripheral surface of the grill body 111 may have a groove portion or opening 114. The groove 114 may provide a space through which a handle or protrusion 144 of the lever device 142 may move.

The lever device 142 may be provided on the suction grill 110 and may be operated by a user. The lever device 142 may include a lever body 143 having a ring shape, and the lever device 142 may be rotated with respect to the suction grill 110 via the handle 144. The filter 120 may be provided on a filter support or support device 140, which may be seated on the lever body 143 of the lever device 142. When the lever device 142 is rotated clockwise or counterclockwise, the filter support 140 may be raised or lowered to fix and loosen the filter 120 for securing and removal.

The lever body 143 may include a lever protrusion or lock 145 protruding upward from an outer edge or rim of an upper surface of the lever body 143. There may be a plurality of lever protrusions 145 provided on the lever body 143 that are spaced apart from each other in the circumferential direction. Each lever protrusion 145 may have an inclined surface that is inclined upward or downward in the circumferential direction. The lever protrusions 145 may engage with a bottom of the filter support 140.

A handle 144 may protrude in the radial direction from the outer edge or an outer peripheral surface of the lever body 143. The user may hold the handle 144 and rotate the lever body 143 clockwise or counterclockwise by rotating the handle 144 in the groove 114.

The filter support 140 may be configured to hold or support the filter 120, and the lever device 142 may support a bottom of the filter support 140. The filter support 140 may include a support protrusion that protrudes downward from an outer edge to contact or engage with the lever protrusion 145. There may be a plurality of support protrusions corresponding to the plurality of lever protrusions 145. Each support protrusion may have an inclined surface upward or downward in the circumferential direction.

When the lever body 143 is rotated via the handle 144, the lever protrusion 145 may be rotated together with the lever body 143 and may rotate relative to the support protrusions of the filter support 140. When an upper or higher portion of the lever protrusion 145 abuts or contacts a lower portion of the support protrusion, the filter support 140 may be pushed upward to fix a position of the filter 120 into a secured state. In such a configuration, the inclined surfaces of the lever protrusion 145 and the support protrusion may not exactly align. When a lower portion of the lever projection 145 contacts or abuts an upper or higher portion of the support protrusion, the filter support 140 may descend downward to place the filter 120 into a removable state. In such a configuration, the inclined surfaces of the lever protrusion 145 and the support protrusion may be aligned. When the filter support 140 is descended downward, a space may be formed so that the filter 120 may be removed from the second air purifier 2.

The first air purifier 1 may further include a filter frame 130, which may form a space in which the filter 120 may be mounted. The filter frame 130 may include a first or lower frame 131 forming a lower portion of the filter frame 130 and a second or upper frame 132 forming an upper portion of the filter frame 130.

The first frame 131 may have an approximate ring shape. A ring-shaped inner space of the first frame 131 may form at least a part of an air passage or channel passing through the filter frame 130. However, a shape of the first frame 131 is not limited to a ring shape, and may be configured to correspond to an outer contour of the filter 120.

The lever device 142 and the filter support 140 may be positioned on an inner peripheral surface of the first frame 131. An upper surface of the filter support 140 may include a seating surface on which the filter 120 is placed. The first frame 131 may include a cutout portion or handle space 131a to allow movement of the handle 144 of the lever device 142. The handle 144 may be rotated clockwise or counterclockwise in the handle space 131a to rotate the filter support 140.

The second frame 132 may be spaced upward from the first frame 131. The second frame 132 may have an approximate ring shape. A ring-shaped inner space of the second frame 132 may form at least a part of the air path passing through the filter frame 130. However, a shape of second frame 132 is not limited to a ring shape, and may be configured to correspond to an outer contour of the filter 120.

The upper portion or surface of the second frame 132 may support a fan housing 150, which will be described later. A skirt on an outer periphery of the second frame 132 may hold the filter 120 by holding the lifted filter 120.

The filter frame 130 may further include a side support or wall 135 extending upward from the first frame 131 toward the second frame 132. The first and second frames 131 and 132 may be spaced apart from each other by the side support 135. A plurality of side supports 135 may be arranged in the circumferential direction and connect rims of the first and second frames 131 and 132.

The mounting space in which the filter 120 is placed may be defined by the first and second frames 131 and 132 and the plurality of side supports 135. The filter 120 can be detachably mounted in the mounting space. The filter 120 may have a cylindrical shape, and air may be introduced through the outer circumferential surface of the filter 120 to remove impurities such as fine dust, pollutants, or dirt.

Since the filter 120 may have a cylindrical or curved shape, air may be introduced in any direction with respect to the filter 120. Accordingly, the filter surface may be increased in area, and an amount of air can suctioned through the filter 120 may be increased.

The mounting space may have a shape (e.g., cylindrical) corresponding to the shape of the filter 120. The filter 120 may be slidably received in the mounting space during a mounting process and may be slidably drawn out from the mounting space in a separating process.

When the handle 144 is operated to separate the filter 120, the filter 120 and the filter support 140 may move downward to a release position. A space may be formed below the mounting space to increase an overall distance between the filter support 140 and the second filter frame 132, and the filter 120 may be slid radially outward and separated from the mounting space. After removal, a new or replacement filter 120 may be slid radially inward toward the mounting space to be placed on the upper surface of the filter support 140. When the handle 144 is operated to secure the filter 120, the filter 120 and the filter support 140 may be brought closer to the second frame 132, and the filter 120 can be placed in a coupling or mounting position.

A support cover 136 may be coupled to an outside of the side support 135. There may be a plurality of support covers 136 corresponding to a plurality of side supports 135 to cover the side supports 135.

The first air purifier 1 may be provided with a suction device or assembly 100 to provide an inflow or suction pressure to suction air into the side and base suction portions 102 and 103 and to the filter 120. The suction device 100 may be provided above the filter 120 suction filtered air from the filter 120 upward.

The suction device 100 may include a fan housing 150 installed or located at an outlet side of (i.e., above) the filter 120. A fan or blower 160 may be provided in the fan housing 150. The fan housing 150 may be supported by the second filter 132 of the filter frame 130.

There may be a fan 160 inside each of the first, second, and third air purifiers 1, 2, and 3. Each fan 160 may have a circular cross-section even though each air purifier 1, 2, and 3 may have a square cross section. The case 101 and the suction device 100 may be spaced apart from each other if the oblique line providing the sectional view of FIG. 3 is taken as a diagonal line of a horizontal polygonal square of the air purifier.

A fan inlet or opening 152 provided in a lower portion of the fan housing 150 may guide an inflow of air in the fan housing 150. The fan inlet 152 may include a grill to prevent fingers or other objects from going into the fan housing 150 during removal and insertion of the filter 120.

The fan 160 may rotate to suction air through the side and base suction portions 102 and 103 and the filter 120. The fan 160 may be positioned above the fan inlet 152. The fan 160 may be a centrifugal fan that introduces air in the axial direction and discharges air upward in the radial direction.

The fan 160 may include a hub 161 to which a rotation shaft of a fan motor 165 is coupled, a shroud 162 spaced apart from the hub 161, and a plurality of blades 163 provided between the shrouds 162. The fan motor 165 may be coupled to the fan 160 and may be a centrifugal fan motor.

The hub 161 may have a bowl shape having a diminishing diameter in a downward direction. The hub 161 may include a shaft coupling portion to which the rotation shaft is coupled and a first blade coupling portion that extends obliquely upward from the shaft coupling portion. The shroud 162 may include a lower end portion formed with a shroud inlet port through which air having passed through the fan inlet 152 is suctioned. A second blade coupling portion may extend upward from the lower end portion.

One side of the blade 163 may be coupled to the first blade coupling portion of the hub 161, while the other side of the blade 163 may be coupled to the second blade coupling portion of the shroud 162. The plurality of blades 163 may be spaced apart from each other in the circumferential direction of the hub 161.

Air passing through the filter 120 may flow upward into the fan housing 150 through the fan inlet 152. The air from the filter 120 may flow in the axial direction of the fan 160 and flow out through the blade 163. An edge of the blade 163 may be inclined or curved outward and upward to correspond to the flow direction of the air so that outflowing air can flow upward in the radial direction.

The suction device 100 may further include an air guide 170 coupled to an upper side of the fan 160 to guide the flow of the air passing through the fan 160. The air guide 170 may be positioned above the fan housing 150. The air guide 170 may be configured to be stacked on top of the fan housing 150. For example, the air guide 170 may have an outer diameter equal or similar to an outer diameter of an upper rim of the fan housing 150 to guide the flow discharged from the fan 160.

The air guide 170 may include an outer wall 171 and an inner wall 172 located inside the outer wall 171 so that the outer wall 171 surrounds the inner wall 172. The outer and inner walls 171 and 172 may have a cylindrical shape. A diameter of the outer wall 171 may be larger than a diameter of the inner wall 172, and a first air passage 172a through which air from the fan 160 flows may be formed between an inner circumferential surface of the outer wall 171 and an outer circumferential surface of the inner wall 172. The diameter of the outer wall 171 may be an outer diameter of the air guide 170 and the diameter of the inner wall 172 may be an inner diameter of the air guide 170.

The air guide 170 may further include a motor receiving portion or cavity 173 extending downward from the inner wall 172 to receive the fan motor 165. The motor receiving portion 173 may have a bowl shape having a diminishing diameter in the downward direction. A motor coupling part may be provided at a side of the fan motor 165 to guide and fix the fan motor 165 into the air guide 170.

A shape or inner contour of the motor receiving portion 173 may correspond to a shape or outer contour of the hub 161. The motor receiving portion 173 may be inserted into the hub 161.

The fan motor 165 may be supported on the upper side of the motor receiving portion 173. The rotation shaft of the fan motor 165 may extend downward from the fan motor 165 and may extend through a hole or opening in a bottom portion of the motor receiving portion 173 to be coupled to the shaft coupling portion of the hub 161.

The air guide 170 may further include a guide vane 175 provided in the first air passage 172a. The guide vane 175 may extend from the outer circumferential surface of the inner wall 172 to the inner circumferential surface of the outer wall 171. There may be a plurality of guide vanes 175 spaced apart from each other in the circumferential direction. The guide vanes 175 may add structural rigidity to the air guide 170.

The plurality of guide vanes 175 may guide air introduced into the first air passage 172a of the air guide 170 upward from the fan 160. The guide vanes 175 may extend obliquely upward to be rounded or curved. A shape of the guide vanes 175 may be configured to guide the air upward.

The suction device 100 may further include the discharge guide 190 having the discharge port 105 so that air passing through the air guide 170 may be discharged to an outside or exterior of the first air purifier 1. The discharge portion 105 may be provided with the discharge grill 192 so that clean air output in the axial direction and the radial direction may have a velocity component in the circumferential direction. The discharge grill 192 may be formed in a spiral shape to guide the air in the circumferential direction.

Figure 5:
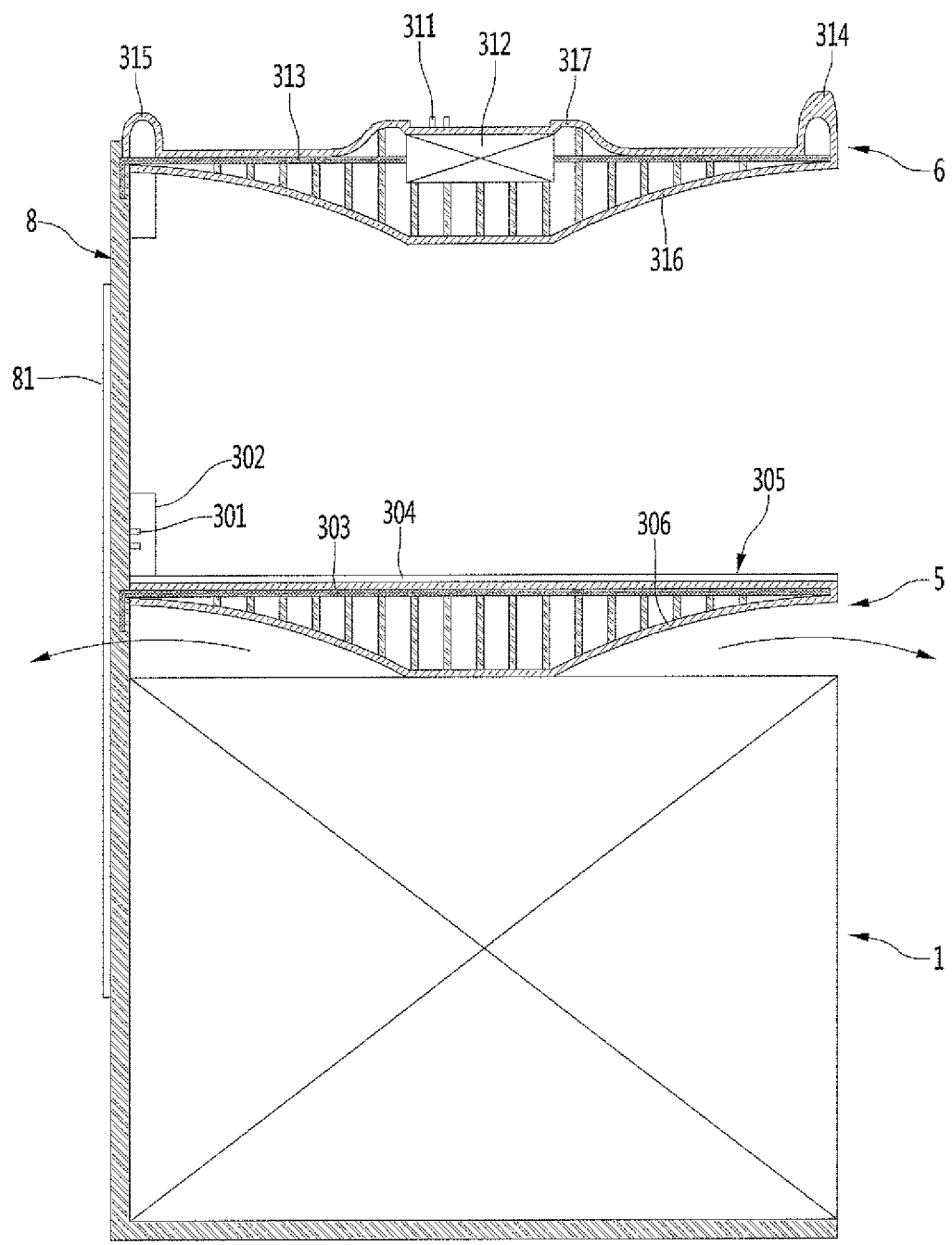
FIG. 5 is a schematic cross-sectional view of a docking station or support frame.

Referring to FIG. 5, the backbone 8, may extend upward from a back or rear side of the first air purifier 1. The backbone 8 may serve as a framework to support a weight of the first air purifier 1 and any air purifiers 2 or 3 or parts placed on the first air purifier 1. The backbone 8 may be formed in a bar shape and may be made of a rigid material such as a resin, steel, or wood. The backbone 8 may be painted.

The backbone 8 may be provided with a light emitting device 81 (e.g., light emitting diode or LED) that is fixed to a rear side of the backbone 8. The light emitting device 81 may have an elongated shape that extends in a longitudinal direction of the backbone. The light emitting device 81 may emit light in a visible wavelength range (i.e., visible light). The light emitting device 81 may be implemented to inform the user of a position or operation status of the air purifying system, power or charge status of the air purifying system, to inform the user of air quality of the indoor space, or may be used to illuminate a space or area surrounding the air purifying system.

The second support 5 supporting the second air purifier 2 may extend forward from the backbone 8 at a position slightly higher than a top of the first air purifier 1. The second support 5 may be fastened to the backbone 8. Alternatively or in addition thereto, a bottom of the second support 5 may be fastened to or supported by the top of the first air purifier 1. For example, when the first air purifier 1 is not removable from the backbone, the second support 5 may be rigidly fixed to the top of the first air purifier 1 for added support, but embodiments disclosed are not limited hereto. In such a configuration, the first air purifier 1 may support a weight of the second support 5 and the second air purifier 2. As another example, the second support 5 may be rigidly attached to the backbone 8, and the bottom of the second support 5 may contact the top of the first air purifier without being fixed. The second support 5 may be positioned as close as possible to the top of the first air purifier 1 in the vertical direction to reduce an overall height and size of the air purifying system.

An upper surface of the second support 5 may have a rectangular or square shape to correspond to a shape of a bottom of a base 20 (FIG. 20) of the second air purifier 2. The second support 5 may stably guide a seating or mounting process of the second air purifier 2 and may support the seated second air purifier 2.

The upper surface of the second support 5 may be defined by an upper surface of an upper frame or pedestal 305. The upper frame 305 may be configured to support a weight of the second air purifier 2 and to receive an entire bottom surface of the second air purifier 2. The upper frame 305 may be supported by a lower frame or beam 303. The upper frame 305 may be made of a resin material, for example, and the lower frame 303 may be made of a strong material such as metal.

The upper frame 305 and the lower frame 303 may be formed separately and later integrated (e.g., welded, bonded adhered). Alternatively, the upper and lower frames 305 and 303 of the second support 5 may be formed integrally as a member by, for example, injection molding.

A rail 304 may protrude upward from the upper surface of the upper frame 305 and extend in a longitudinal direction or forward. A bottom of the second air purifier 2 may have a rail seating groove or recess 314 (FIG. 6) configured to slide along the rail 304. Alternatively, a rail may be formed on a bottom of the second air purifier 2, and a rail seating groove or recess may be formed in the upper surface of the upper frame 305. A second support connection terminal 301 and a second support wireless charging module 302 may be provided in the backbone 8 at a position adjacent to a rear of the upper frame 305. When the second air purifier 2 is seated on the second support 5, a rear of the second air purifier 2 may connect to the second support connection terminal 301 or be aligned with the second support charging module 302.

Figure 6:
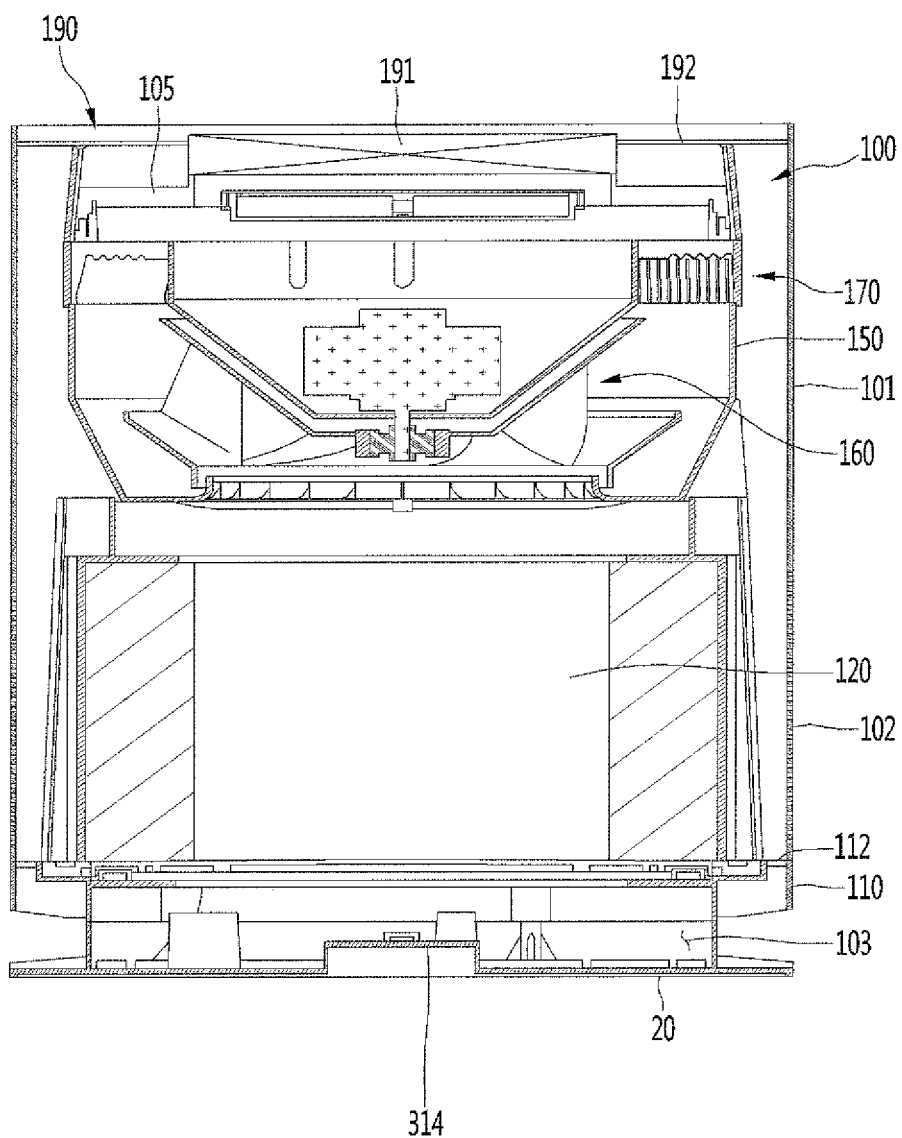
FIG. 6 is a cross-sectional view of a second air purifier.

Referring to FIG. 6, the second air purifier 2 may have a shorter height than that of the first air purifier 1 and may have a smaller air cleaning or purifying capacity than that of the first air purifier 1. A function and action of the second air purifier 2 may be similar to the first air purifier 1 despite being smaller and having a decreased air cleaning capacity.

An interior of the second air purifier 2 may be substantially similar to an interior of the first air purifier 1, and the second air purifier 2 may include a case 101, a base 20, side and base suction portions 102 and 103, a suction grill 110 and suction port 112, a removable filter 120 (e.g., a filter removable from a filter frame and seated on a filter support), a fan 160 provided in a fan housing 150, an air guide 170, and a discharge guide 190 having a discharge grill 192. The second air purifier 2 may optionally include a display 191. The display 191 may show an operation status of the second air purifier 2, temperature information, time information, air quality information, etc. The display 191 may also serve as a light. Alternatively or in addition thereto, the first, second, and third supports 4, 5, and 6 may also include displays.

A rail seating groove 314 may be provided on the bottom of the second air purifier 2. The rail seating groove 314 may have a size, shape, length, and position corresponding to that of the rail 304 so that the second air purifier 2 may be seated on the second support 5 by sliding the rail seating groove 314 onto the rail 304 in the longitudinal direction.

Embodiments disclosed herein are not limited to the rail seating groove 314 being provided on the second air purifier 2 and the rail 304 being provided on the second support 5. For example, the rail 304 may protrude from a bottom of the second air purifier 2 to insert into the rail seating groove 314 formed as a recess in the second support 5. However, after being separated from the docking station 7, the second air purifier 2 may be more stably seated on the floor or on a counter when the second air purifier 2 has the rail seating groove 314 instead of the rail 304. As another example, there may be a plurality of rails 304 corresponding to a plurality of rail seating grooves 314.

Figure 7:
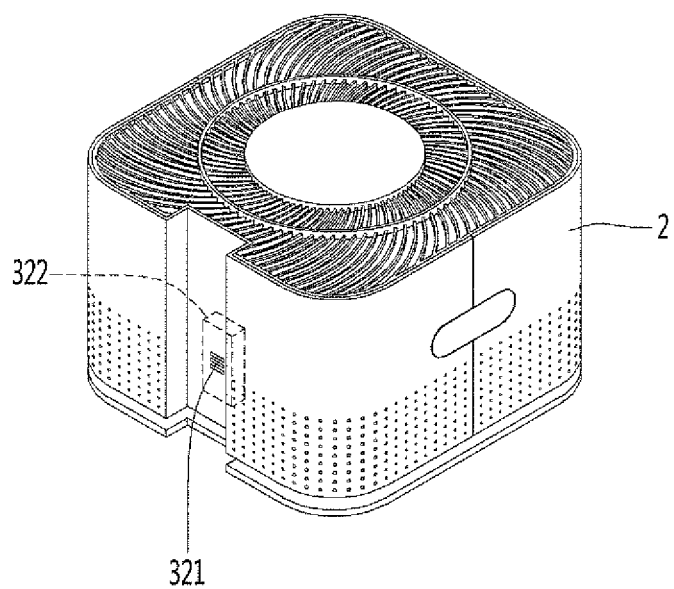
FIG. 7 is a rear perspective view of the second air purifier.

Referring to FIGS. 5-7 to describe a connection of the second air purifier 2 onto the second support 5, a rear portion of the second air purifier 2 may include a second purifier connection portion or terminal 321 corresponding to the second support connection terminal 301 of the second support 5. The second purifier connection portion 321 may be configured to electrically connect or couple to the second support connection terminal 301 of the second support 5. The second air purifier 2 may also include a second purifier charging module 322, which may electrically couple or interact with the second support charging module 302. The second purifier and support charging modules 322 and 302 may be wireless charging modules implementing a wireless transfer process (WPT) or electromagnetic induction. The second purifier and support charging modules 322 and 302 may include wireless power transceivers, transmitters, and/or receivers.

The second support connecting terminal 301 and the second purifier connecting portion 321 may be connected to each other when the rail seating groove 314 of the second air purifier 2 is slid onto the rail 304 of the second support 5 and the rear of the second air purifier 2 contact the front of the backbone 8. In such a position, the second purifier and support charging modules 322 and 302 may be aligned. The rear of the second air purifier 2 may have a groove or recess configured to fit onto the backbone 8.

A physical wired connection may be completed in such a position as the second support connection terminal 301 is fitted to the second purifier connection portion 321. For example, of the second support connection terminal 301 or the second purifier connection portion 321 may have electrodes, and the other may include grooves or recesses that the electrodes fit into. A signal connection between the second support and purifier charging modules 302 and 322 may be completed wirelessly without physical contact, and wireless charging may be performed.

Upon connecting the second support connection terminal 301 and the second purifier connecting portion 321, the second air purifier 2 may communicate with other components or devices (e.g., fan motors 165, displays 191, etc.) provided in the entire air purifying system. As another example, wire charging may be performed. Alternatively or in addition thereto, the docking station 7 may have a controller and a communication module, and the first, second, and/or third air purifiers 1, 2, and/or 3 may have a communication module to communicate with communication modules of the docking station 7 or of other air purifiers. The communication modules may have WiFi or BlueTooth modules, for example. The first, second, and third supports 4, 5, and 6 may include optional or alternative communication modules.

Positions of the second support connection terminal 301 and the second support charging module 302 may not be limited to a front surface of the backbone 8; for example, the second support connection terminal and charging module 301 and 302 may be provided on the upper frame 305 of the second support 5, and a bottom of the second air purifier 2 may include the second purifier connection portion and charging module 321 and 322 to correspond to the second support connection terminal and charging module 301 and 302, respectively. However, a user may be able to recognize a complete connection when the second support connection terminal and charging module 301 and 302 are provided in the backbone 8, and the second air purifier 2 may be more stably positioned on the second support 5 and more closely contact the second support 5 and the backbone 8.

Referring back to FIG. 5, the second support 5 may be configured to adjust or guide air flow. The lower frame 303 may include a flow guide 306 formed as a lower surface or portion of the second support 5. The flow guide 306 may have a concave curvature from the bottom of the second support 5, which may be provided at a center, upward and outward toward the upper frame 305. The flow guide 306 may be symmetrical in a radial direction, and may resemble a trumpet head shape.

The flow guide 306 may guide air discharged from the first air purifier 1, which may flow in axial and/or radial directions, to flow in the radial direction out toward sides of the air purifying system. The air may be guided by the flow guide 306 to a region to the side of the air purifying system, which may begin to become concentrated with clean air.

Figure 12:
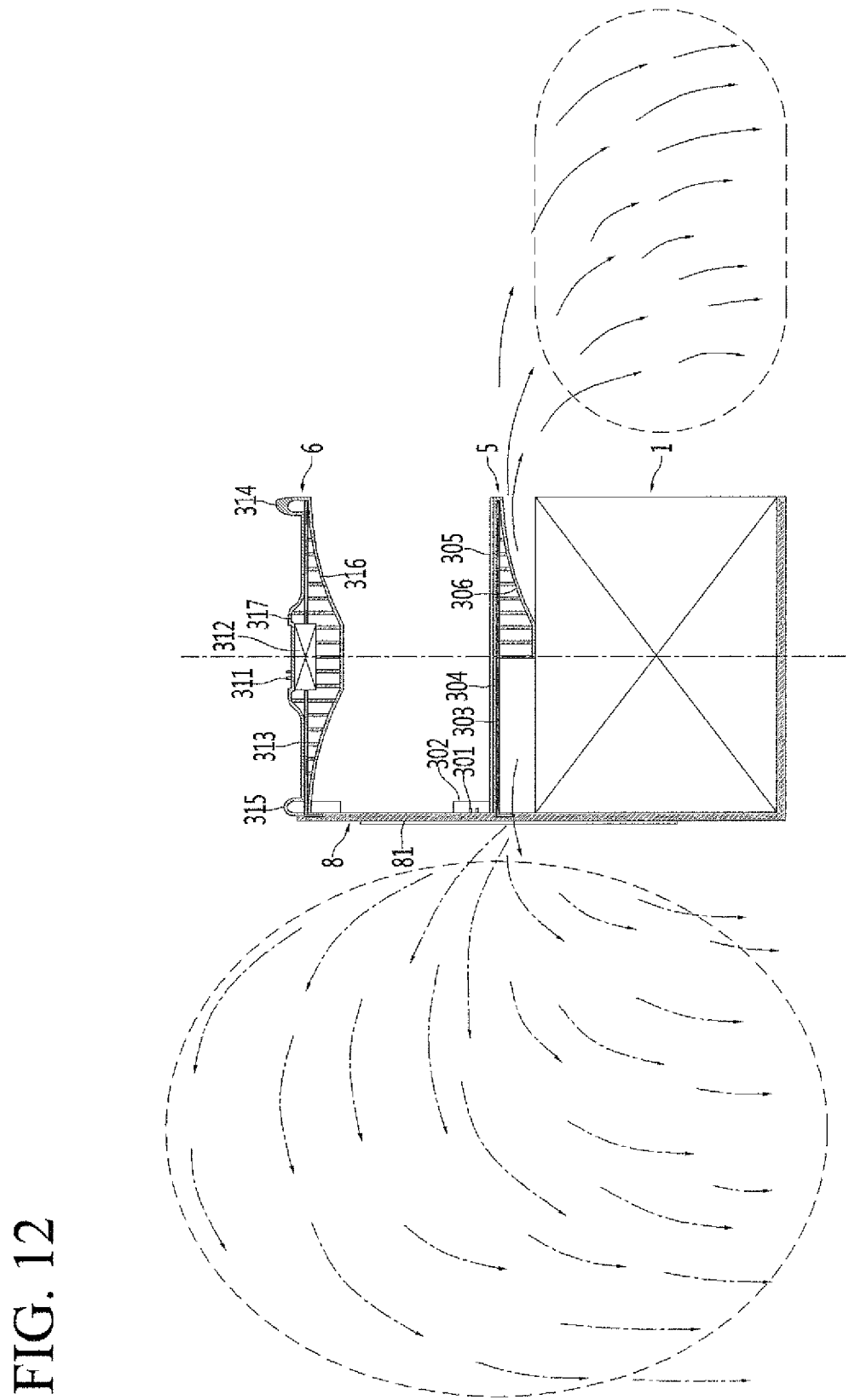
FIG. 12 is a view showing an air flow according to a flow guide.

(FIG. 12, region on the right hand side). This region may be altered depending on how many air purifiers are docked on the docking station.

Figure 8:
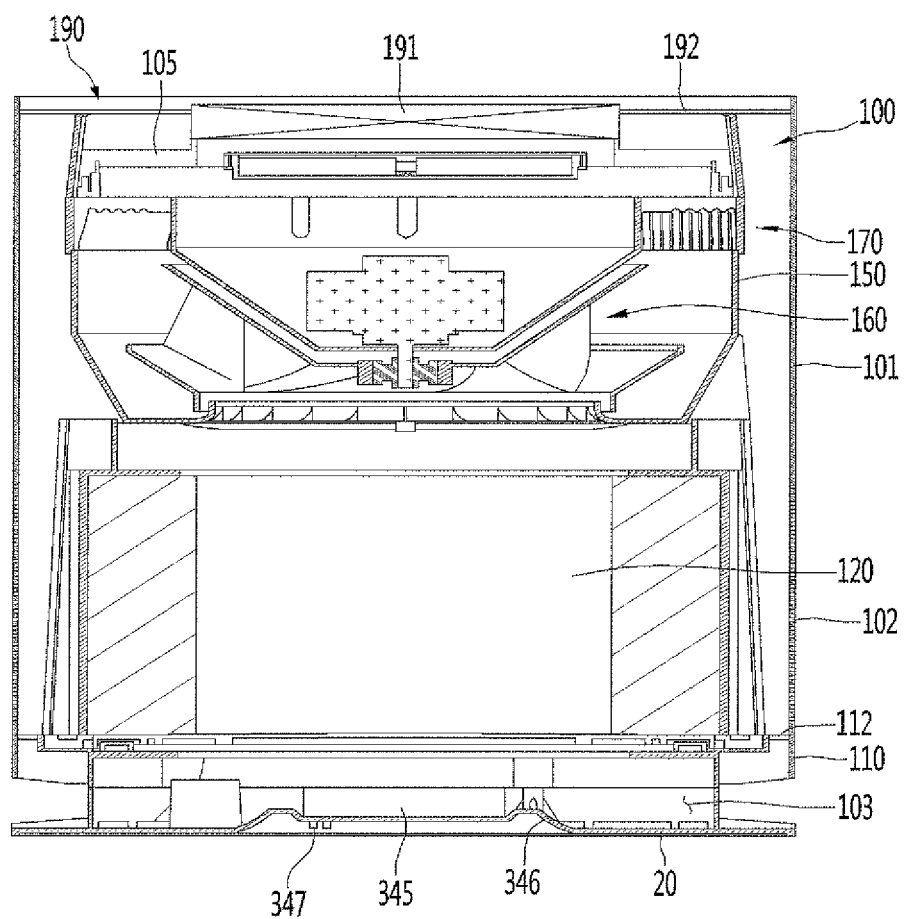
FIG. 8 is a cross-sectional view of a third air purifier.
Figure 9:
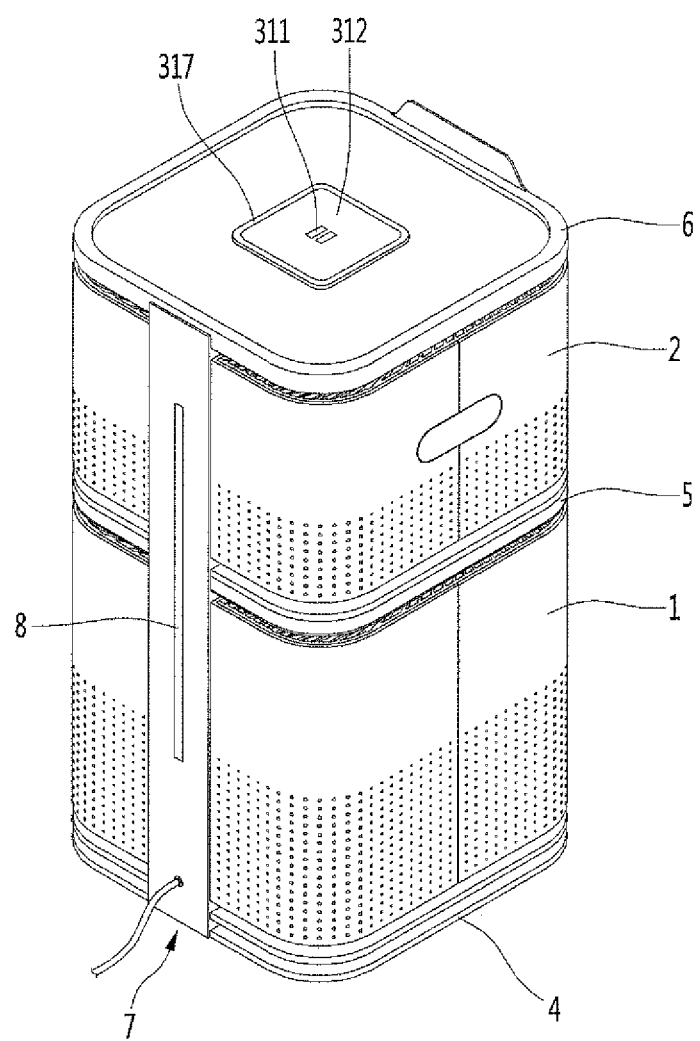
FIG. 9 is a rear perspective view of the air purifying system when the third air purifier is separated and removed.

Referring to FIGS. 5, 8 and 9, the third support 6 may be provided at an upper end of the backbone 8. The third support 6 may include an upper frame 315 and a lower frame 313, which may have similar functions and structures to those of the upper frame 305 and the lower frame 305 of the second support 5. However, an edge or rim of the upper frame 315 may protrude slightly upward so as to form a sidewall or protrusion to contain and/or support the third air purifier 3 and prevent displacement or shifting of the third air purifier 3 when the third air purifier 3 is seated on the third support 6. The third air purifier 3 may remain stably supported on the third support 6 if an external impact is applied to the docking station 7, backbone 8, or the air purifying system.

The third support 6 may have a similar structure to the second support 5, and differences between the second and third supports 5 and 6 will be described hereinafter. A description of similar features may be omitted.

The third support may include a fitting bar or support 314 protruding upward from a front end or side of the upper frame 315. The fitting bar 314 may also be referred to as an alignment bar, tab, or flange. A fitting or seating protrusion 317 may protrude upward from a center of the upper frame 315. The fitting bar 314 and the fitting protrusion 317 may maintain a position of the third air purifier 3 on the upper frame 315. The fitting bar 314 may have an optional display provided on a front face so that the user may see a display status without bending over a top of the third air purifier 3.

The fitting bar 314 may make it easier for a user to gauge where to grasp the third air purifier 3 during removal and placement. For example, a user standing in front of the air purifying system may place the third air purifier 3 down on the upper frame 315 and gauge a left-right alignment between the third air purifier 3 and the third support 6. However, alignment in the anteroposterior direction (i.e., front-back direction) may not be easily gauged from his field of view, and so the fitting bar 314 may assist the user in approximating a front-back alignment of the third air purifier 3.

The fitting protrusion 317 may also assist in maintaining an alignment of the third air purifier 3 when the third air purifier 3 and the third support 6 are approximately aligned by the fitting bar 314. The protruding rim of the upper frame 315 may maintain an alignment of a base 20 of the third air purifier 3.

Wired and/or wireless connections between the third air purifier 3 and the third support 6 may be safely performed when the protruding rim of the upper frame 315, the fitting protrusion 317, and the fitting bar 314 are used as alignment guides. The third support 6 may include a third support connection terminal 311 and a third support charging module 312, which may have similar functions to the second support connection terminal and charging module 301 and 302, respectively. The third support connection terminal 311 and a third support charging module 312 may be provided in a recessed portion of the fitting protrusion 317, as an example.

Referring to FIGS. 3, 8, and 9, the third air purifier may include a seating or fitting groove or recess 346 having an inner contour corresponding in size and shape to an outer contour if the fitting protrusion 317. The fitting protrusion 317 may be inserted into the fitting groove 346 to maintain a position of the third air purifier 3 on the third support 6. When the fitting protrusion 317 and the seating groove 346 are fitted to each other, the third air purifier 3 may not rock or fall when an external is applied.

A third purifier charging module 345 and a third purifier connection terminal or portion 347 may be provided in the seating groove 346 to correspond to the the third support charging module 312 and the third support connection terminal 311, respectively. The third purifier charging module 345 and a third purifier connection terminal or portion 347 may have functions similar to the second purifier charging module and connection portion 322 and 321, respectively. Therefore, a detailed description thereof will be omitted.

An interior of the third air purifier 3 may be substantially similar to an interior of the first and second air purifier 1 and 2, and the third air purifier 2 may include a case 101, a base 20, side and base suction portions 102 and 103, a suction grill 110 and suction port 112, a removable filter 120 (e.g., a filter removable from a filter frame and seated on a filter support), a fan 160 provided in a fan housing 150, an air guide 170, and a discharge guide 190 having a discharge grill 192 and a discharge portion 105. The third air purifier 3 may optionally include a display 502. The display 502 may show an operation status of the third air purifier 3, temperature information, time information, air quality information, etc. The display 502 may also serve as a light.

Referring back to FIG. 5, the third support 6 may include a flow guide 316 similar to the flow guide 306 of the second support 5. The flow guide 316 may be provided on a lower surface of the lower frame 313 of the third support 6 and have a shape, structure, and configuration similar to the flow guide 306 of the second support 6. A distance between the flow guide 316 and the second air purifier 2 may be adjusted to adjust a direction and speed of the air discharged from a top of the second air purifier 2 in the radial direction.

The third support 6 may be connected to the backbone 8, and may only be supported by a top of the second air purifier 2 when the second air purifier 2 is docked on the docking station 7. The third support 6 may sag or become deformed by a weight of the third air purifier 3, and the third support 6 may be susceptible to deeper sagging after repeated use. Sagging may prevent a seamless or easy insertion of the second air purifier 2 onto the second support 5. To prevent sagging, the third support 6 may be configured to be slightly inclined upward from the backbone 8.

Figure 10:
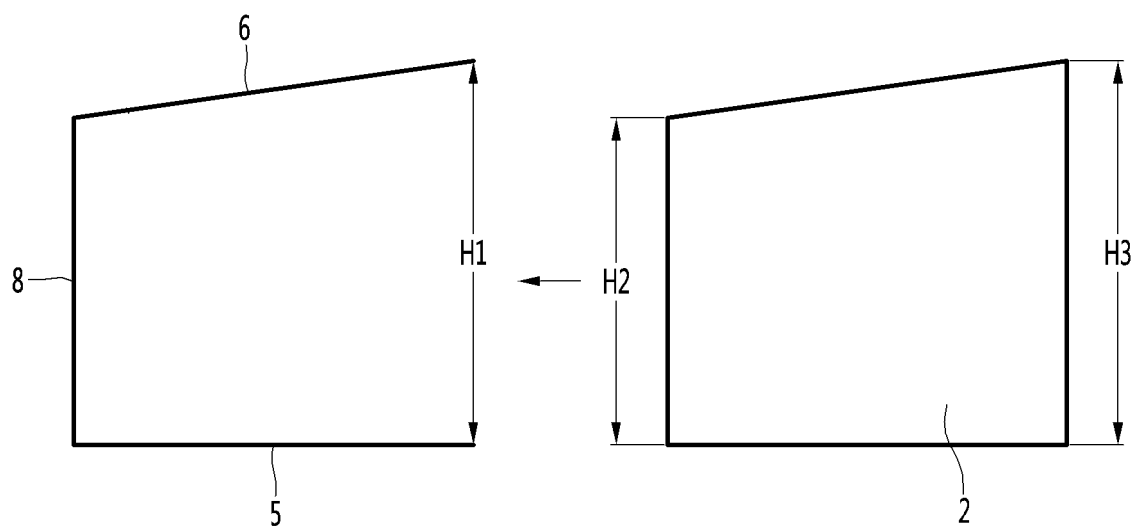
FIG. 10 is a simplified view of height relationships between the second support or second support section and the second air purifier inserted therein.

Referring to FIG. 10, a distance H1 between front ends of the second and third supports 5 and 6 may be greater than a distance between rear ends of the second and third supports 5 and 6. The distance H1 may also be greater than rear and front heights H2 and H3 of the second air purifier 2. The case 101 of the second air purifier 2 may also be inclined slightly such that the front height H3 is greater than the rear height H2. The second air purifier 2 may resemble a wedge. A relationship of the distances H1, H2, and H3 may be expressed by the following Equation 1:

$$H1>H2, \text{ and } H2<H3 \qquad \text{[Equation 1]}$$

Even when the third support 6 sags, a relationship of $H1 \geq H2+5$ cm may be satisfied so that the second air purifier 2 may be inserted onto the rail 305 of the second support 5. In FIG. 10, each line segment may be regarded as connecting inner surfaces of corresponding members. Each line segment may be virtually linearly connected to a portion causing interference at a time of inserting the second air purifier 2.

Figure 11:
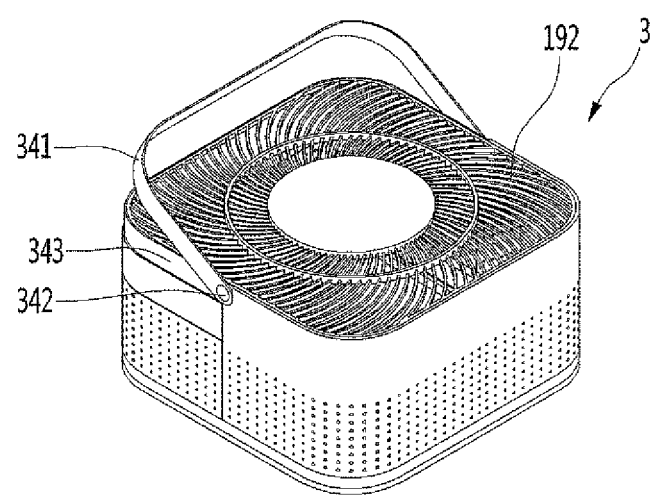
FIG. 11 is a front perspective view of the third air purifier.

Referring to FIG. 11, a discharge grill 192 may be provided at a periphery of the display 502, and the display 502 may be provided at a center of the upper surface of the third air purifier 3. As an example, the display 502 may face upward so that a user looking down at the upper surface of the third air purifier 3 may view the display 502, but embodiments disclosed are not limited hereto. As an alternative example, the display 502 may protrude upward to face a front, and the user may view the display 502 by looking at the front of the air purifying system.

A handle 341 may extend from at least one side of the third air purifier 3. The user may conveniently carry and transport the third air purifier 3 via the handle 341. Since the third air purifier 3 may be smallest is size, weight, and air cleaning capacity, the user may not require any assistive force or any transport devices to move and/or reposition the third air purifier 3.

As an example, the handle 341 may resemble a bucket handle hinged to opposite sides of the third air purifier 3. The handle 341 may be fixed to the case 101 by a hinge 342 to be rotatable. An upper portion of a side of the case 101 of the third air purifier may include a handle groove 343 which is recessed inward. A size and shape of the handle groove 343 may correspond to a size and shape of the handle 341, and when the handle 341 is not in use, the handle 341 may be rotated to a storage position to be inserted and stored in the handle groove 343. When the user desires to use the handle 341, the handle 341 may be rotated via the hinge 342 to a use position. The handle 341 may be stored in the handle groove 343 to prevent an external object from unnecessarily catching on the handle 341 and knocking down the third air purifier 3 and/or the docking station 7.

Referring to FIG. 12, the flow guide 306 of the second support 5 may guide a flow direction of clean air discharged from the first air purifier 1. The flow guide 306 may change a direction of the discharged air flowing in the axial direction to the radial direction. In FIG. 12, arrows show the flow of the discharge air discharged from the first air purifier 1. Referring to the arrows, clean air immediately discharged from the first air purifier 1 may have a relatively large flow rate, and may be directed outward to the side.

The air discharged from the first air purifier 1 may be guided by the flow guide to target a side clean area, which is indicated by a dotted line on the right side of the first air purifier 1. The air directed to the side clean area on the right may become concentrated, and may not be widely spread or dispersed. The air in the side clean area may remain at a particular height, and may not spread too much in the upward and downward directions.

The dotted line on the left side of the first air purifier 1 exemplifies an area to which discharged air may be directed when the flow guide 306 is omitted. Such an area on the left may be referred to as a diffused clean area, as the clean air may not be as concentrated in the diffused clean area as in the side clean area. Dimensions of the first air purifier 1 and/or the flow guide 306 may be configured so that discharged air targets predetermined diffused clean areas and/or side clean areas. For example, the first air purifier 1 may be wider than longer, and air flowing in the axial direction may be relatively strong.

The side clean area may be provided 50 centimeters or less from the floor, which may be a space where infants play. The flow guide 306 may be used when intensive air purification is required for positions adjacent to the first air purifier 1, such as when the air purifier is first brought home, returned to a room that has become dirty, when a cleaning capacity of the first air purifier 1 is insufficient, or when the first air purifier 1 beings operation. The flow guide 316 of the second air purifier 2 may be configured similarly to the flow guide 306 of the first air purifier 1, and the second air purifier 2 may be configured to target similar side clean and diffused clean areas.

Hereinafter, the operation of the air purifying system according to an embodiment will be described in more detail. The user may conveniently move each air purifier and may conveniently operate each air purifier even when the second and third air purifiers 2 and 3 are not docked on the docking station 7, and an operation of the separated second and third air purifiers 2 and 3 will be described. The numbers used in FIG. 13 may be assigned different numbers to those used in the above for convenience of understanding. For example, in the above description, the reference number 81 was used for a light emitting device, but in FIG. 13, reference number 735 may denote the light device. As another example, the wireless charging modules previously denoted by reference numbers 322, 345 may be denoted as reference number 731 in FIG. 13.

Figure 13:
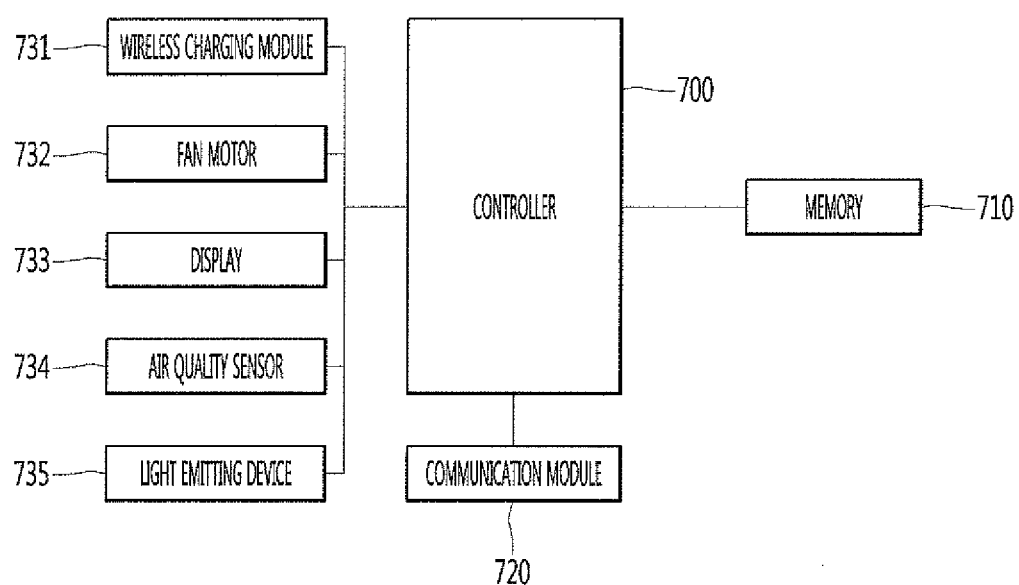
FIG. 13 is a block diagram explaining a configuration of an air purifying system according to an embodiment.

Referring to FIGS. 5 and 13, each of the first, second, and third air purifiers 1, 2, and 3 may include a control module or controller 700, a memory or storage 710, and a communication module 720 to that each of the air purifiers 1, 2, and 3 may be controlled independently, stored, and may communicate with each other and exchange information. The first, second, and third air purifiers 1, 2, and 3 may include a wireless charging module 731, a fan motor 732, a display 733, an air quality sensor 734, and at least one light emitting device 735. Alternatively, only the second and third air purifiers 2 and 3 may include a wireless charging module 731 and/or an air quality sensor 734, and only the first air purifier 1 may include a light emitting device 735. The first air purifier 1 may be integrated with the backbone 8. The docking station 7 may include a second support connection terminal 301, a second support wireless charging module 302, a third support connection terminal 311, and a third support wireless charging module 312 provided in the backbone 8 and/or the second and third supports 5 and 6 so as to charge the wireless charging modules 731 of the first and second air purifiers 1 and 2 at a rear and/or a bottom.

A charging connection with the second air purifier 2 may be completed when the second air purifier 2 is correctly seated on the second support 5. When the second air purifier 2 is inserted on and slid along the rail 304, the second support wireless charging module 302 and the wireless charging module 731 (322 in FIG. 5) may be aligned at a rear side. A signal connection between the wireless charging modules 302 and 731 may be completed without physical contact, and wireless charging may be performed at a slight distance. As another example, a wireless connection may be completed by communication between the communication modules 720. A physical wired connection may be completed when the second support connection terminal 301 is fitted to a second purifier connection portion or terminal 321 (FIG. 7).

A charging connection with the third air purifier 3 may be completed when the third air purifier 3 is correctly seated on the third support 6. When the third air purifier 3 is seated on the third support 6, the third support wireless charging module 312 and the wireless charging module 731 (345 in FIG. 8) may be aligned at a bottom. A signal connection between the wireless charging modules 312 and 731 may be completed without physical contact, and wireless charging may be performed at a slight distance. As another example, a wireless connection may be completed by communication between the communication modules 720. A physical wired connection may be completed when the third support connection terminal 311 is fitted to a third purifier connection portion or terminal 347 (FIG. 8). Each air purifier 1, 2, and 3 may be charged wirelessly or by wire.

The light emitting device 735 may be operated in various modes under the control of the controller 700. For example, the light emitting device 735 may be provided on a rear of the backbone 8, and the backbone 8 may be positioned so that the light emitting device 735 may face a wall so that the light emitting device 735 may indirectly illuminate an indoor space via indirect illumination reflected from the wall. The backbone 8 may be positioned close to the wall so as to reduce a likelihood of obstruction of the light emitted and/or shadows. The light emitting device 735 may emit various colors of light, and may, for example, be implemented to indicate an air quality of the indoor space by the emitted color.

This application is related to co-pending U.S. application Ser. No. 16/818,096 filed on Mar. 16, 2020 and Ser. No. 16/818,180 filed on Mar. 13, 2020, whose entire disclosures are hereby incorporated by reference.

Embodiments disclosed herein may provide a single air purifying system having a plurality of air purifiers that may be stacked and combined in various ways to perform various air cleaning or purifying operations to suit or correspond to an indoor space. At least two air purifiers may be capable of individually operating in separate spaces or rooms, or stacked on top of each other to operate together in the same space. The two air purifiers may be capable of individual operation and may be integrated together by other device such as a docking station. The air purifiers may be separated from the docking station so that individual operation may be performed in different environments.

Embodiments disclosed herein may provide an air cleaning or purifying system and an air cleaning or purifying system control method capable of variously operating a plurality of air purifiers in a variety of places in accordance with a residential environment by using a single air cleaning or purifying system.

Embodiments disclosed herein may provide an air cleaning or purifying system and an air cleaning or purifying system control method that may be customized to perform air cleaning on particular spaces by simply moving and/or individually operating individual air purifiers to particular places. A user may not have to manually set different operating settings.

Embodiments disclosed herein may provide an air cleaning or purifying system and a control method of an air cleaning system that may address various air cleaning capacity or CFM needs depending on an installation space or room, individual taste, and/or environmental needs. Embodiments disclosed herein may provide an air cleaning or purifying system in which an air cleaner or purifier may be freely separated from and mounted on to the air purifying system, improving convenience and customization.

Embodiments disclosed herein may be implemented as an air purifying or purifying system including at least two air cleaners or purifiers capable of independently operating and a docking frame or station to support the air purifiers from below and restrict a movement of the air purifiers. Clean air may be efficiently supplied to various indoor rooms, spaces, or areas, including large partitioned areas.

The docking frame may include a backbone extending in a vertical direction and at least two frames or supports supported by the backbone and extending forward. The two supports may be spaced apart in the vertical direction and correspond to the two air purifiers. An illumination lamp or light device may be provided on a back surface of the backbone. The illumination lamp may provide indirect illumination so that a user may conveniently use the air purifying system.

The backbone may have a wireless charging module or transceiver, and another wireless charging module or transceiver may be provided in any one of the at least two air purifiers. When an air purifier having a wireless charging module is mounted on the docking station, the wireless charging modules of the backbone and air purifier may align, and the air purifier may be automatically charged, improving convenience.

The support may include a wireless charging module or transceiver to interact with a wireless charging module or transceiver provided in any one of the at least two air purifiers. When an air purifier having a wireless charging module is mounted on the docking station, the wireless charging modules of the support and air purifier may align, and the air purifier may be automatically charged, improving convenience. The docking station may also serve as an air purifier and perform an air purifying function, improving convenience.

At least one of the two air purifiers may be guided along rails of the docking station to be mounted on the support. The air purifier may be guided by the rails to be seated in a correct position on the docking station, improving convenience. The rails may be formed in an upper surface of the support, and a bottom surface of the air purifier may include a groove configured to slide over the rail during seating. Rails may alternatively be formed at sides of the support to maintain a position of the air purifier on the support.

Embodiments disclosed herein may be implemented as an air purifying or cleaning system comprising at least two air purifiers or cleaners configured to operate independently and a docking frame or station configured to receive, support, and secure the air purifiers. The docking frame may include a backbone extending in a vertical direction and at least two pedestals or supports supported by the backbone, spaced apart in the vertical direction, extending forward, and configured to support the at least two air purifiers, respectively. The supports may support bottoms of the air purifiers such that the air purifiers are stacked on the docking frame. At least one of the backbone or the support may also include an air purifier. Unlike the two air purifiers previously mentioned, such an air purifier may not be separated from the backbone. includes the air purifier. A charging module, wireless power transceiver, and/or a charging pad may be provided in the docking station so that when an air purifier is docked on the docking station, the air purifier may be automatically charged, improving convenience.

Embodiments disclosed herein may provide at least two or more air purifiers or cleaners suitable for a plurality of compartmentalized indoor spaces or rooms. The air purifiers may be combined and/or integrated into a single air purifying or cleaning system. Clean air may be appropriately supplied to the plurality of indoor spaces at the same time.

The individual air purifiers may be easy to move and may remain in a state of being charged with energy. The user may carry out an optimal air purifying operation by carrying an air purifier of a desired air cleaning or purifying capacity and moving the air purifier to an indoor space or room to be operated in the room.

Embodiments disclosed herein may provide a more diversified air purifying operation by using a plurality of individual air purifiers together or separating them for a specific purpose or indoor room, allowing the air purifying system to address a diverse range of needs and types of indoor spaces.

The air purifying system may be light, chargeable, and easily controllable, improving convenience, and also separable and customizable.

Embodiments disclosed herein may be implemented as an air purifying system comprising a first air purifier including a first fan to suction air, a first filter to filter suctioned air, and a first discharge port through which filtered air is discharged, a second air purifier including a second fan to suction air, a second filter to filter suctioned air, and a second discharge port through which filtered air is discharged, and a docking station. The docking station may include a vertical support extending in a vertical direction, and first and second horizontal supports configured to support the first and second air purifiers, respectively. The first and second horizontal supports may extend in a horizontal direction from the vertical support and may be spaced apart from each other by a predetermined distance in the vertical direction. The docking station may include a third air purifier provided below the first and second horizontal supports.

The second horizontal support may include a frame having a rim that protrudes upward, a tab protruding upward from a front of the rim, a protrusion protruding upward from an upper surface of the frame at a center, a wireless charging module provided under the center of the upper surface, and a connection terminal provided on the protrusion. When the second air purifier is seated on the second horizontal support, the connection terminal may connect to the second air purifier and the wireless charging module may charge the second air purifier.

The first horizontal support may be provided under the second horizontal support such that the first air purifier is configured to slide between the first and second horizontal supports to couple to the docking station. An upper surface of the first horizontal support may include a rail extending from the vertical support to a front of the first horizontal support. A bottom surface of the first air purifier may include a groove configured to be slid along the rail.

At least one of a wireless charging module or a connection terminal may be provided at a front of the vertical support between the first and second horizontal supports to charge the first air purifier when the first air purifier is seated on the first horizontal support. A bottom surface of the second horizontal support may be inclined upward from the vertical support to a front and may include a flow guide having a convex curvature so as to guide discharged air radially outward. The discharged air may be air discharged from the first air purifier when the first air purifier is seated on the first horizontal support. The flow guide may be radially symmetrical.

A third air purifier may be provided. The first horizontal support may be a predetermined height above a bottom end of the docking station. The third air purifier may be configured to be supported on the docking station under the first horizontal support. A bottom surface of the first horizontal support may include a flow guide.

At least one of the first or second air purifiers may have a square horizontal cross-section. At least one of the first or second horizontal supports may have a square horizontal cross-section.

The predetermined distance may increase from the vertical support toward a front. The first air purifier may have a height that increases from a rear to a front. The first air purifier may be configured to be supported between the first and second horizontal supports.

The vertical support may include a light emitting device to at least one illuminate a surrounding area or indicate an air quality. The docking station may include a wireless charging module provided on at least one of the vertical support, the first horizontal support, or the second horizontal support. At least one of the first or second air purifiers may include a wireless charging module configured to align with the wireless charging module of the docking station when the air purifier having the wireless charging module is seated on the docking station.

Embodiments disclosed herein may be implemented as an air purifying system comprising a first air purifier including a first fan to suction air, a first filter to filter suctioned air, and a first discharge port through which filtered air is discharged in an axial direction of the first fan, a second air purifier including a second fan to suction air, a second filter to filter suctioned air, and a second discharge port through which filtered air is discharged in an axial direction of the second fan, and a flow guide provided between the first and second air purifiers. The axial direction of the first fan may be the axial direction of the second fan. The first and second air purifiers may be supported in a linear alignment in the axial direction of the first and second fans of the first and second air purifiers. The flow guide may be configured to guide discharged air in a radial direction of the first fan of the first air purifier.

A first support may support the first air purifier and a second support may support the second air purifier. A bottom of the second support may include the flow guide. The second air purifier may be configured to be seated on a top surface of the second support. The flow guide may be configured to guide discharged air to a predetermined area provided radially adjacent to the air purifying system.

Embodiments disclosed herein may be implemented as an air purifier comprising a case defining an inner space, a fan and a filter provided in the inner space, and a base provided below the case. An upper end of the base may have a smaller horizontal cross-sectional area than a horizontal cross-sectional area of the case. At least one opening may be provided between the base and the case. An intake may be provided at the at least one opening under the case at a position such that air is suctioned in a vertical direction through the intake. A handle may be hinged to an upper end of the case.

A groove may be formed in a side of the case and be configured to receive the handle. A groove may be formed on a bottom of the base and be configured to slide along a rail.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An air purifying system, comprising:
   a first air purifier including a first fan to suction air, a first filter to filter suctioned air, and a first discharge port through which filtered air is discharged;
   a second air purifier including a second fan to suction air, a second filter to filter suctioned air, and a second discharge port through which filtered air is discharged; and
   a docking station including:
      a vertical support extending in a vertical direction, and first and second horizontal supports configured to support the first and second air purifiers, respectively, the first and second horizontal supports extending in a horizontal direction from the vertical support and spaced apart from each other by a predetermined distance in the vertical direction.

2. The air purifying system of claim 1, wherein the docking station includes a third air purifier provided below the first and second horizontal supports.

3. The air purifying system of claim 1, wherein the second horizontal support includes:
   a frame having a rim that protrudes upward;
   a tab protruding upward from a front of the rim;
   a protrusion protruding upward from an upper surface of the frame at a center;
   a wireless charging module provided under the center of the upper surface; and
   a connection terminal provided on the protrusion, wherein, when the second air purifier is seated on the second horizontal support, the connection terminal connects to the second air purifier and the wireless charging module charges the second air purifier.

4. The air purifying system of claim 1, wherein the first horizontal support is provided under the second horizontal support such that the first air purifier is configured to slide between the first and second horizontal supports to couple to the docking station.

5. The air purifying system of claim 4, wherein an upper surface of the first horizontal support includes a rail extending from the vertical support to a front of the first horizontal support, and a bottom surface of the first air purifier includes a groove configured to be slid along the rail.

6. The air purifying system of claim 4, wherein at least one of a wireless charging module or a connection terminal is provided at a front of the vertical support between the first and second horizontal supports to charge the first air purifier when the first air purifier is seated on the first horizontal support.

7. The air purifying system of claim 4, wherein a bottom surface of the second horizontal support is inclined upward from the vertical support to a front and includes a flow guide having a convex curvature so as to guide discharged air radially outward, the discharged air being air discharged from the first air purifier when the first air purifier is seated on the first horizontal support.

8. The air purifying system of claim 7, wherein the flow guide is radially symmetrical.

9. The air purifying system of claim 7, further comprising a third air purifier, wherein the first horizontal support is a predetermined height above a bottom end of the docking station, the third air purifier is configured to be supported on the docking station under the first horizontal support, and a bottom surface of the first horizontal support includes another flow guide.

10. The air purifying system of claim 1, wherein at least one of the first or second air purifiers has a square horizontal cross-section.

11. The air purifying system of claim 1, wherein at least one of the first or second horizontal supports has a square horizontal cross-section.

12. The air purifying system of claim 1, wherein
the predetermined distance increases from the vertical support toward a front,
the first air purifier has a height that increases from a rear to a front, and
the first air purifier is configured to be supported between the first and second horizontal supports.

13. The air purifying system of claim 1, wherein the vertical support includes a light emitting device to at least one of illuminate a surrounding area or indicate an air quality.

14. The air purifying system of claim 1, wherein the docking station includes a wireless charging module provided on at least one of the vertical support, the first horizontal support, or the second horizontal support, and at least one of the first or second air purifiers includes a wireless charging module configured to align with the wireless charging module of the docking station when the air purifier having the wireless charging module is seated on the docking station.

15. The air purifying system of claim 1, comprising:
a flow guide provided between the first and second air purifiers, the flow guide being configured to guide discharged air in a radial direction of the first fan of the first air purifier.

16. The air purifying system of claim 15, wherein a bottom of the second support includes the flow guide, and the second air purifier is configured to be seated on a top surface of the second support.

17. The air purifying system of claim 15, wherein the flow guide is configured to guide discharged air to a predetermined area provided radially adjacent to the air purifying system.

18. The air purifying system of claim 1, comprising:
a handle hinged to an upper end of a case of second air purifier.

19. The air purifier of claim 18, further comprising a groove formed in a side of the case and configured to receive the handle.

20. The air purifier of claim 1, wherein the first air purifier includes a groove formed on a bottom of the base and configured to slide along a rail.

* * * * *